(12) United States Patent
Saito

(10) Patent No.: US 6,738,979 B1
(45) Date of Patent: May 18, 2004

(54) SATELLITE BROADCAST RECEIVER WHICH IS NOT INFLUENCED BY UNNECESSARY SIGNAL COMPONENTS

(75) Inventor: Shingo Saito, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/565,622

(22) Filed: May 4, 2000

(30) Foreign Application Priority Data

May 10, 1999 (JP) ............................................ 11-129129

(51) Int. Cl.[7] .............................. H04N 7/20; H03K 9/00; H03K 19/094; H03K 19/0175; H03K 19/00
(52) U.S. Cl. .............................. 725/68; 725/70; 725/73; 375/316; 326/86; 326/93
(58) Field of Search ............................ 725/68, 85, 139, 725/151; 334/7, 8, 11; 348/731, 733; 455/77

(56) References Cited

U.S. PATENT DOCUMENTS 6,218,862 B1 * 4/2001 Meyer ......................... 326/86
6,359,938 B1 * 3/2002 Keevill et al. ............... 375/316

FOREIGN PATENT DOCUMENTS

JP          11-234355          8/1999

* cited by examiner

Primary Examiner—Andrew Faile
Assistant Examiner—Hai V. Tran
(74) Attorney, Agent, or Firm—Brinks Hofer Gilson & Lione

(57) ABSTRACT

A receiver at least comprising: a BS tuner; a demodulating unit; a control unit; a modulating unit; a CATV signal converting unit; and a digital-to-analog converting unit, the control unit, the digital-to-analog converting unit controlled by a control signal from the control unit, and the BS tuner being connected via an I²C bus, and a channel selection signal outputted from the control unit being supplied to the BS tuner via the I²C bus, wherein a gate circuit is connected to the I²C bus, a gate ON signal is supplied to the gate circuit only when the channel selection signal is supplied to the BS tuner, and the channel selection signal is supplied to the BS tuner via

3 Claims, 4 Drawing Sheets

US 6,738,979 B1

SATELLITE BROADCAST RECEIVER WHICH IS NOT INFLUENCED BY UNNECESSARY SIGNAL COMPONENTS

BACKGROUND OF THE INVENTION

1. Field of the Invention

The present invention relates to a receiver and, more particularly, to a receiver for receiving a satellite broadcast (BS or CS broadcast), processing a received signal, converting the received signal to a CATV (cable television) signal, and outputting the CATV signal.

2. Related Art

Generally, a cable television system is constructed by CATV broadcast facilities disposed in the center and a number of CATV broadcast contracted receivers connected to the CATV broadcast facilities via RF transmission paths such as optical fibers or coaxial transmission paths. The CATV broadcast facilities provide various CATV broadcasts of a plurality of channels to each of the CATV broadcast contracted receivers via the RF transmission paths. On the other hand, the user of the contracted receiver selects a broadcast of a desired channel among the CATV broadcasts of the plurality of channels supplied from the CATV broadcast facilities and watches the selected broadcast by his/her contracted receiver.

The CATV broadcast facilities provide service of outputting a received satellite broadcast as a CATV broadcast to the RF transmission path. The service is received by an receiver comprising: a satellite broadcast tuner for receiving a satellite broadcast: a demodulating unit for demodulating an output signal of the satellite broadcast tuner and reproducing a baseband signal; a control unit for processing the demodulated baseband signal; a modulating unit for modulating the processed baseband signal and generating a modulated signal; and a CATV signal converting unit for converting the modulated signal into a CATV broadcast signal adapted to a CATV broadcast transmitted.

FIG. 4 is a block diagram showing an example of the configuration of a satellite broadcast signal—CATV broadcast signal converting mechanism, that is, a satellite broadcast receiver in known CATV broadcast facilities.

As shown in FIG. 4, the satellite broadcast receiver comprises: a BS broadcast receiving antenna 41; a satellite broadcast tuner 42 which is a BS tuner; an IC (Integrated Circuit) 43 for demodulation including an I/Q demodulating unit $43_1$ and a QPSK demodulating unit $43_2$; a control unit 44 for performing an MPEG process; an IC (Integrated Circuit) 45 for modulation including a QAM unit $45_1$; a CATV signal converting unit 46; a digital-to-analog (D/A) converter 47; and a CATV signal output terminal 48.

The signal input terminal of the satellite broadcast tuner 42 is connected to the BS broadcast receiving antenna 41 and the signal output terminal is connected to the signal input terminal of the I/Q demodulating unit $43_1$ The signal input terminal of the QPSK demodulating unit $43_2$ is connected to the signal output terminal of the I/Q demodulating unit $43_1$, and the signal output terminal of the QPSK demodulating unit $43_2$ is connected to the signal input terminal of the control unit 44. The signal input terminal of the QAM unit $45_1$ is connected to the signal output terminal of the control unit 44, and the signal output terminal of the QAM unit $45_1$ is connected to the signal input terminal of the CATV signal converting unit 46. The signal output terminal of the CATV signal converting unit 46 is connected to the CATV signal output terminal 48. The signal input and output terminals of the digital-to-analog converter 47 are connected to the control signal output terminal of the control unit 44 and a channel selection signal input terminal of the satellite broadcast tuner 42 via an I square C ($I^2C$) bus 49, respectively. An $I^2C$ bus 50 is connected between the control signal output terminal of the control unit 44 and the channel control terminal of the CATV signal converting unit 46 via the QAM unit $45_1$ (IC 45 for modulation).

The satellite broadcast receiver having the above configuration operates as follows.

When a BS broadcast is received by the BS broadcast receiving antenna 41, the received signal is amplified and frequency-converted (down-converted) by the satellite broadcast tuner 42 and is outputted as an intermediate frequency signal. The intermediate frequency signal is converted by the I/Q demodulating unit $43_1$ into an I signal and a Q signal whose phases are different from each other by 90 degrees. The I and Q signals are converted to QPSK modulated signals by the QPSK demodulating unit $43_2$. The QPSK modulated signals are subjected to image compression by an MPEG process in the control unit 44 and the resultant signals are outputted as baseband signals. The baseband signals are subjected to quadrature amplitude modulation by the QAM unit $45_1$. A quadrature amplitude modulated signal is amplified and frequency-converted (up-converted) by the CATV signal converting unit 46 and a resultant signal is outputted as a radio-frequency (RF) CATV signal to an RF transmission path (not shown) via the CATV signal output terminal 48.

In this case, a digital channel selection signal outputted from the control signal output terminal of the control unit 44 is supplied to the digital-to-analog converter 47 via the $I^2C$ bus 49 and is converted by the digital-to-analog converter 47 to an analog channel selection signal. The analog channel selection signal is supplied to a channel selection signal input terminal via the $I^2C$ bus 49 and the channel selection of the satellite broadcast tuner 42 is performed. A channel selection signal outputted from the control signal output terminal of the control unit 44 to the $I^2C$ bus 50 is supplied to the channel control terminal of the CATV signal converting unit 46 via the QAM unit $45_1$ to select the channel of an RF signal outputted from the CATV signal converting unit 46.

In the known satellite broadcast receiver, the control unit 44, digital-to-analog converter 47, and satellite broadcast tuner 42 are connected via the $I^2C$ bus 49. Another known satellite broadcast receiver has a configuration such that the control unit 44, IC 43 for demodulation, and satellite broadcast tuner 42 are connected via the $I^2C$ bus.

The known satellite broadcast receiver has the configuration such that the control unit 44, digital-to-analog converting unit 47, and satellite broadcast tuner 42 are connected to the $I^2C$ bus 49 for transmitting a channel selection signal from the control unit 44 to the satellite broadcast tuner 42 or the configuration such that the control unit 44, IC 43 for demodulation, and satellite broadcast tuner 42 are connected to the $I^2C$ bus 49. Consequently, when a serial clock (SCL) and serial data (SDA) is transmitted via the $I^2C$ bus between the control unit 44 and the digital-to-analog converting unit 47 or between the control unit 44 and the IC 43 for demodulation, the serial clock and serial data is transmitted also to the satellite broadcast tuner 42 via the $I^2C$ bus. When the serial clock and serial data is supplied to the channel selection signal input terminal of the satellite broadcast tuner 42, digital frequency components of the serial clock and serial data are multiplexed on a local oscillation signal and supplied to the signal line. It increases pseudo noise (PN) components in a signal outputted from the satellite broadcast tuner 42, deteriorates the picture quality of a video signal in the signal, and reduces the carrier-to-noise ratio of the satellite broadcast tuner 42.

Similarly, the known satellite broadcast receiver has the construction in which the control unit 44, IC 45 for modulation and CATV signal converting unit 46 are connected. Consequently, when the serial clock (SCL) and serial data (SDA) is transmitted between the control unit 44 and the IC 45 for modulation, the serial clock and serial data is transmitted also to the CATV signal converting unit 46 via the I²C bus 50. In this case as well, when the serial clock and serial data is supplied to the CATV signal converting unit 46, the serial clock and serial data is multiplexed on signals from the parts in the CATV signal converting unit 46. It deteriorates the quality of the CATV signal outputted from the CATV signal converting unit 46.

SUMMARY OF THE INVENTION

The present invention has been achieved in consideration of the technical background. A first object of the invention is to provide a receiver which checks supply of unnecessary signal components by connecting a gate circuit to an I²C bus connected to a satellite broadcast tuner and turning on the gate circuit only when a channel selection signal is supplied to the satellite broadcast tuner.

A second object of the invention is to provide a receiver which checks supply of unnecessary signal components by connecting a gate circuit to an I²C bus connected to a CATV signal converting unit and turning on the gate circuit only when a channel selection signal is supplied to the CATV signal converting unit.

In order to achieve the first object, there is provided a receiver at least comprising: a satellite broadcast tuner; a demodulating unit; a control unit; a modulating unit; a CATV signal converting unit; and a digital-to-analog converting unit. The control unit, a unit controlled by a control signal from the control unit, and the satellite broadcast tuner are connected to each other via an I²C bus, and a channel selection signal outputted from the control unit is supplied to the satellite broadcast tuner via the I²C bus. The receiver has first means in which a gate circuit is connected to the I²C bus, a gate ON signal is supplied to the gate circuit only when the channel selection signal is supplied to the satellite broadcast tuner, and the channel selection signal is supplied to the satellite broadcast tuner via the gate circuit.

In an example of the first means, the controlled unit is an analog-to-digital converting unit connected between the control unit and the satellite broadcast tuner, the gate circuit is connected to the I²C bus which is provided between the analog-to-digital converting unit and the satellite broadcast tuner, and the gate ON signal outputted from the analog-to-digital converting unit is supplied to the gate circuit.

In another example of the first means, the controlled unit is an IC for demodulation including the demodulating unit, and the gate circuit is connected to the I²C bus provided between the IC for demodulation and the satellite broadcast tuner, and a gate ON signal outputted from the control unit is supplied to the gate circuit.

In order to achieve the second object, there is provided a receiver according to the invention at least comprising: a satellite broadcast tuner; a demodulating unit; a control unit; a modulating unit; a CATV signal converting unit; and a digital-to-analog converting unit. The control unit, an IC for modulation including the modulating unit, and the CATV signal converting unit are connected via an I²C bus for control signal transfer, and a channel selection signal outputted from the control unit is supplied to the CATV signal converting unit via the I²C bus. The receiver has second means in which a gate circuit is connected to the I²C bus positioned between the IC for modulation and the CATV signal converting unit, a gate ON signal is supplied from the control unit to the gate circuit only when the channel selection signal is supplied to the CATV signal converting unit, and the channel selection signal is supplied to the CATV signal converting unit via the gate circuit.

According to the first means, when the channel selection signal is supplied to the satellite broadcast tuner, the gate circuit connected to the I²C bus is opened and the channel selection signal is supplied to the satellite broadcast tuner via the opened gate circuit. On the other hand, when the channel selection signal is not supplied to the satellite broadcast tuner, the gate circuit is closed and no signal or no data is supplied via the I²C bus to the satellite broadcast tuner. Consequently, unnecessary signal and data components are not multiplexed on each of the parts of the satellite broadcast tuner. A good quality intermediate frequency signal can be therefore outputted from the satellite broadcast tuner and the operating state of the satellite broadcast tuner does not deteriorate.

According to the second means, when the channel selection signal is supplied to the CATV signal converting unit, the gate circuit connected to the I²C bus is opened and the channel selection signal is supplied via the opened gate circuit to the CATV signal converting unit. On the other hand, when the channel selection signal is not supplied to the CATV signal converting unit, the gate circuit is closed and no signal or no data is supplied to the CATV signal converting unit via the I²C bus, and unnecessary signals and data components are not multiplexed on parts of the CATV signal converting unit. A good quality CATV signal can be outputted from the CATV signal converting unit and the operating state of the CATV signal converting unit does not deteriorate.

DETAILED DESCRIPTION OF THE PREFERRED EMBODIMENTS

Embodiments of the invention will be described hereinbelow with reference to the drawings.

Figure 1:
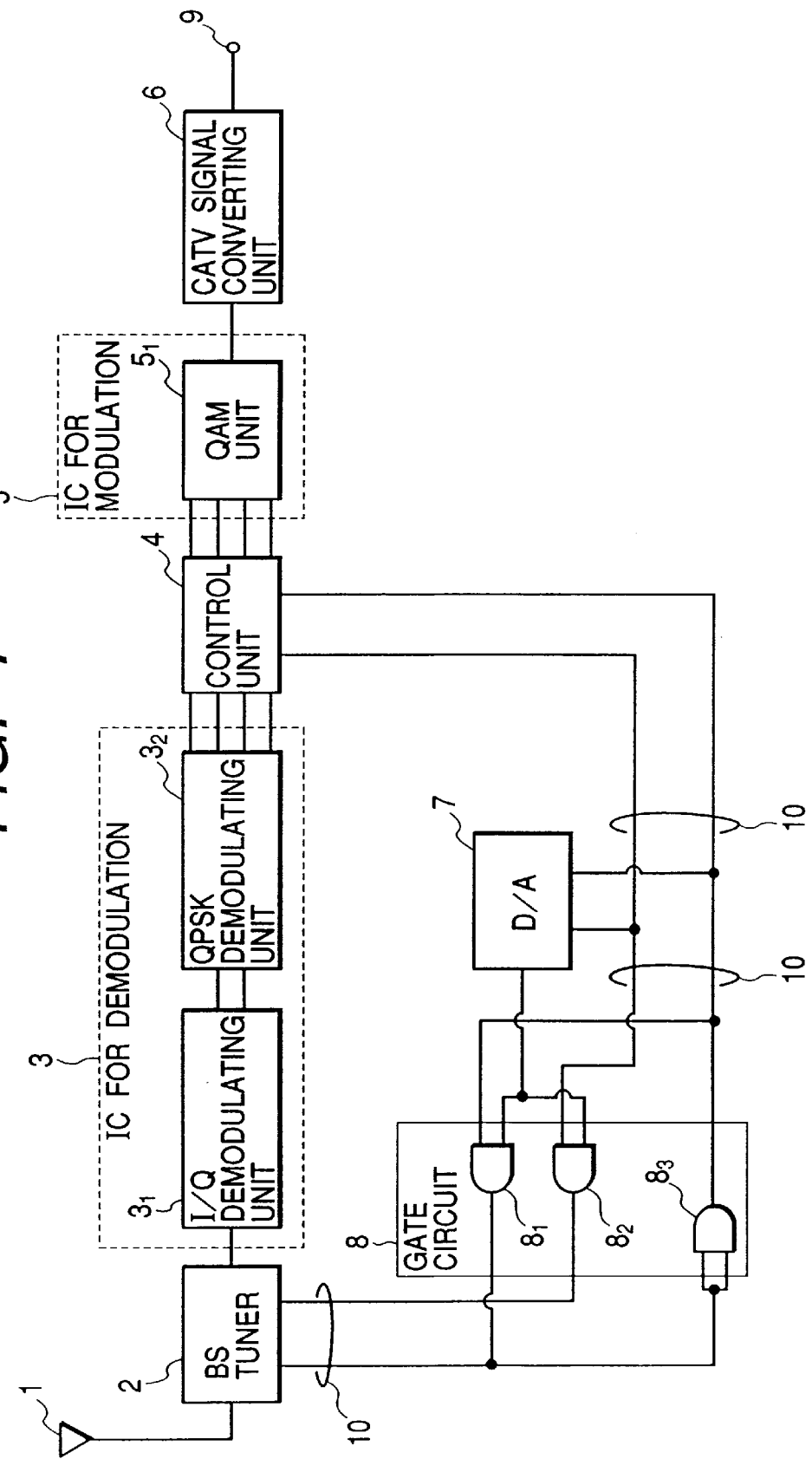
FIG. 1 is a block diagram showing the configuration of a first embodiment of a receiver according to the invention.

FIG. 1 is a block diagram showing the configuration of a first embodiment of a receiver according to the invention and shows an example of receiving a BS broadcast by a satellite broadcast tuner.

As shown in FIG. 1, a receiver according to a first embodiment comprises: a BS broadcast receiving antenna 1; a satellite broadcast tuner 2 which is a BS tuner; an IC (Integrated Circuit) 3 for demodulation including an I/Q demodulating unit $3_1$ and a QPSK demodulating unit $3_2$; a control unit 4 for performing an MPES process; an IC (Integrated Circuit) 5 for modulation including a QAM unit $5_1$; a CATV signal converting unit 6; a digital-to-analog converter (D/A) 7; a gate circuit 8 having first to third AND gates $8_1$, $8_2$, and $8_3$; and a CATV signal output terminal 9.

The signal input terminal of the BS tuner 2 is connected to the BS broadcast receiving antenna 1 and the signal output terminal of the BS tuner 2 is connected to the signal input terminal of the I/Q demodulating unit $3_1$. The signal input terminals of the QPSK demodulating unit $3_2$ are connected to the signal output terminals of the I/Q demodulating unit $3_1$ and the signal output terminals of the QPSK demodulating unit $3_2$ are connected to the signal input terminals of the control unit 4. The signal input terminals of the QAM unit $5_1$ are connected to the signal output terminals of the control unit 4 and the signal output terminal of the QAM unit $5_1$ is connected to the signal input terminal of the CATV signal converting unit 6. The signal output terminal of the CATV signal converting unit 6 is connected to the CATV signal output terminal 9. The signal input and output terminals of the digital-to-analog converting unit 7 are connected to the control signal output terminal of the control unit 4 and the input side of the gate circuit 8, respectively, via the I²C bus 10. The output side of the gate circuit 8 is connected to the channel selection signal input terminal of the BS tuner 2 via the I²C bus 10. In the gate circuit 8, the first AND gate $8_1$ has: one input terminal connected to one of the signal input and output terminals of the digital-to-analog converting unit 7; the other input terminal connected to the control terminal of the digital-to-analog converting unit 7; and an output terminal connected to one of channel selection signal input terminals of the BS tuner 2. The second AND gate $8_2$ has: one input terminal connected to the other one of the signal input and output terminals of the digital-to-analog converting unit 7; the other input terminal connected to the control terminal of the digital-to-analog converting unit 7; and an output terminal connected to the other channel selection signal input terminal of the BS tuner 2. The third AND gate $8_3$ has: one and the other input terminals connected to one of the channel selection signal input terminals of the BS tuner 2; and an output terminal connected to one of the signal input and output terminals of the digital-to-analog converting unit 7.

The receiver according to the first embodiment having the above configuration operates as follows.

When a BS broadcast is received by the BS broadcast receiving antenna 1, the reception signal is amplified and frequency-converted (down-converted) by the BS tuner 2 into an intermediate frequency signal and the intermediate frequency signal is outputted. The intermediate frequency signal is converted by the I/Q demodulating unit $3_1$ to an I signal and a Q signal whose phases are different from each other by 90 degrees. The I and Q signals are converted to QPSK modulated signals by the QPSK demodulating unit $3_2$ and the QPSK demodulated signals are outputted. The QPSK modulated signals are subjected to image compression accompanying the MPEG process in the control unit 4 and resultant signals are outputted as baseband signals. The baseband signals are subjected to quadrature amplitude modulation in the QAM unit $5_1$ and a resultant signal is outputted as a QAM signal. Subsequently, the QAM signal is amplified and frequency-converted (up-converted) by the CATV signal converting unit 6 into a radio frequency (RF) CATV signal. The RF CATV signal is outputted via the CATV signal output terminal 9 to an RF transmission path (not shown) such as an optical fiber or coaxial transmission path.

When the control unit 4 outputs the digital channel selecting signal from the control signal output terminal at the time of channel selection of the BS tuner 2, the digital channel selection signal is supplied to the digital-to-analog converting unit 7 via the I²C bus 10 and is converted to an analog channel selection signal by the digital-to-analog converting unit 7. The analog channel selection signal is supplied to the gate circuit 8 via the I²C bus 10. After passing the gate circuit 8, the analog channel selection signal is again supplied to the channel selection signal input terminal of the BS tuner 2 via the I²C bus 10 and the channel selection of the BS tuner 2 in correspondence with the analog channel selection signal is performed.

The digital-to-analog converting unit 7 does not normally generate a control signal of a positive polarity from the control terminal. Only when the analog channel selection signal is outputted to the I²C bus 10, the digital-to-analog converting unit 7 generates the control signal of the positive polarity. When the control signal of the positive polarity is not outputted from the digital-to-analog converting unit 7, the other input terminal of each of the first and second AND gates $8_1$ and $8_2$ in the gate circuit 8 bears the zero potential, and the first and second AND gates $8_1$ and $8_2$ are turned off (closed state). At this time, when any signal or data is supplied to one of the input terminals of each of the first and second AND gates $8_1$ and $8_2$, it is checked by the gate circuit 8 and is not outputted from the gate circuit 8. That is, even when the serial clock (SCL) and serial data (SDA) is supplied from the control unit 4 via the I²C bus 10 to the gate circuit 8, the serial clock and serial data is checked by the gate circuit 8 and is not supplied to the channel selection signal input terminal of the BS tuner 2.

On the other hand, when the control signal of the positive polarity is outputted from the digital-to-analog converting unit 7, a positive voltage is applied to the other input terminal of each of the first and second AND gates $8_1$ and $8_2$ in the gate circuit 8 and the first and second AND gates $8_1$ and $8_2$ are turned on (open state). At this time, when the analog channel selection signal outputted from the digital-to-analog converting unit 7 is supplied to one of the input terminals of each of the first and second AND gates $8_1$ and $8_2$, the analog channel selection signal passes through the gate circuit 8 and is supplied to the channel selection signal input terminal of the BS tuner 2 via the I²C bus 10. The channel selection of the BS tuner 2 is performed by the supplied analog channel selection signal.

As described above, according to the receiver of the first embodiment, only when the analog channel selection signal is supplied from the digital-to-analog converting unit 7 to the BS tuner 2, the gate circuit 8 is turned on by the control signal outputted from the digital-to-analog converting unit 7 and the analog channel selection signal is supplied via the gate circuit 8 to the BS tuner 2. On the other hand, when the analog channel selection signal is not supplied from the digital-to-analog converting unit 7 to the BS tuner 2, the control signal is not outputted from the digital-to-analog converting unit 7, the gate circuit 8 is turned off, and the serial clock and serial data supplied via the I²C bus 10 to the digital-to-analog converting unit 7 is checked by the gate circuit 8, so that an unnecessary signal or data is not supplied to the BS tuner 2.

Figure 2:
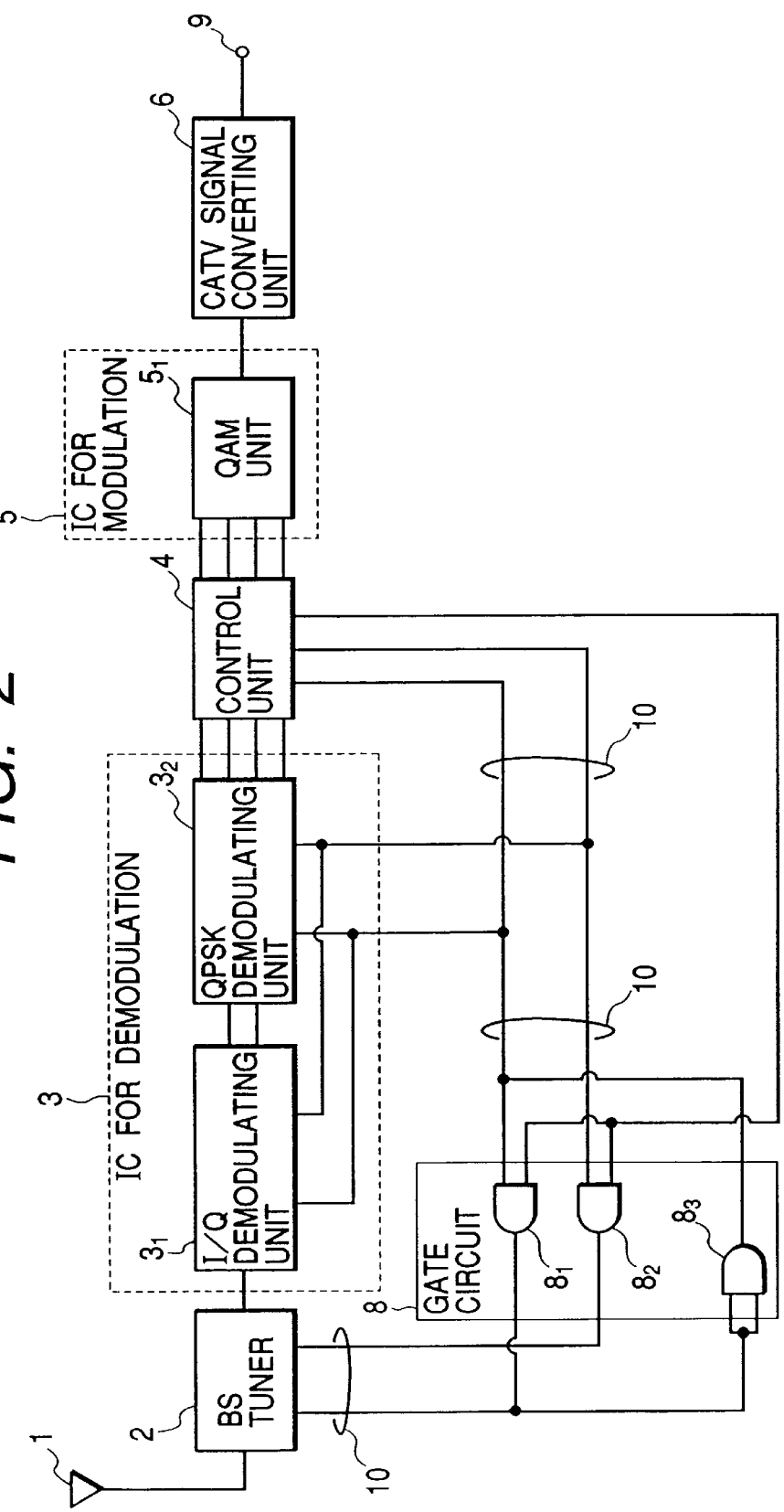
FIG. 2 is a block diagram showing the configuration of a second embodiment of a receiver according to the invention.

FIG. 2 is a block diagram showing the configuration of the second embodiment of the receiver according to the invention and shows an example of receiving a BS broadcast by the satellite broadcast tuner.

As shown in FIG. 2, the receiver according to the second embodiment does not have the digital-to-analog converting unit 7 used in the first embodiment. Instead, the IC 3 for demodulation is connected to the I²C bus 10 and the control signal supplied to the gate circuit 8 is obtained from the control unit 4. The other configuration is the same as that of the first embodiment. In the second embodiment, the components same as those of FIG. 1 are designated by the same reference numerals.

Since the operation of the receiver of the second embodiment is substantially the same as that of the above-described first embodiment, the detailed explanation of the operation is omitted. In the second embodiment as well, only when the channel selection signal is supplied from the control unit 4 to the BS tuner 2 via the I²C bus 10, the gate circuit 8 is turned on by the control signal outputted from the control unit 4 and the channel selection signal is supplied to the BS tuner 2 via the gate circuit 8. Except for the case where the channel selection signal is supplied, the control signal is not supplied from the control unit 4 to the gate circuit 8 and the gate circuit 8 is in the off state. Consequently, the serial clock and serial data supplied from the control unit 4 to the IC 3 for demodulation via the I²C bus 10 is checked by the gate circuit 8, so that an unnecessary signal or data is not supplied to the BS tuner 2.

Figure 3:
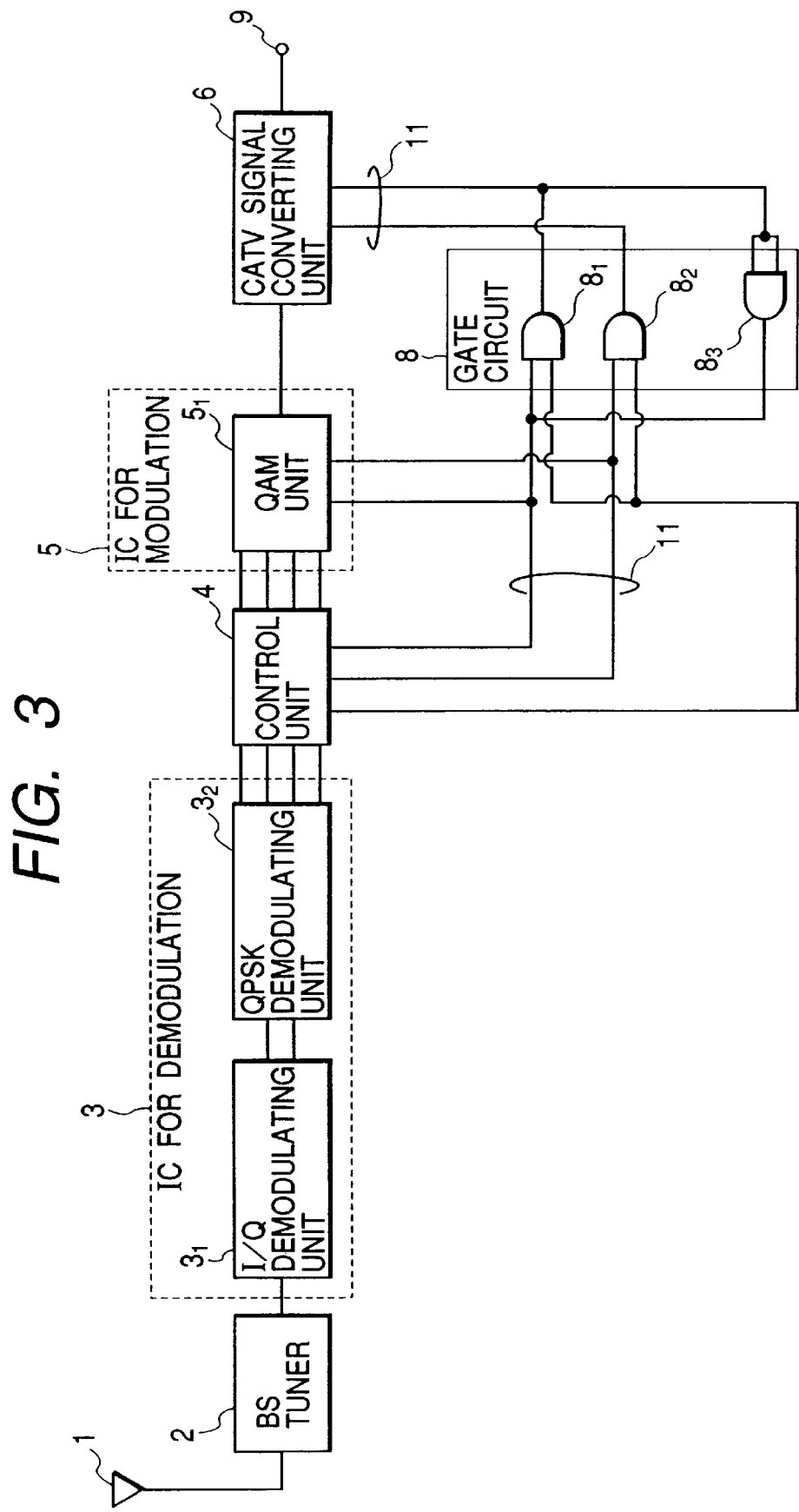
FIG. 3 is a block diagram showing the configuration of the second embodiment of the receiver according to the invention.
Figure 4:
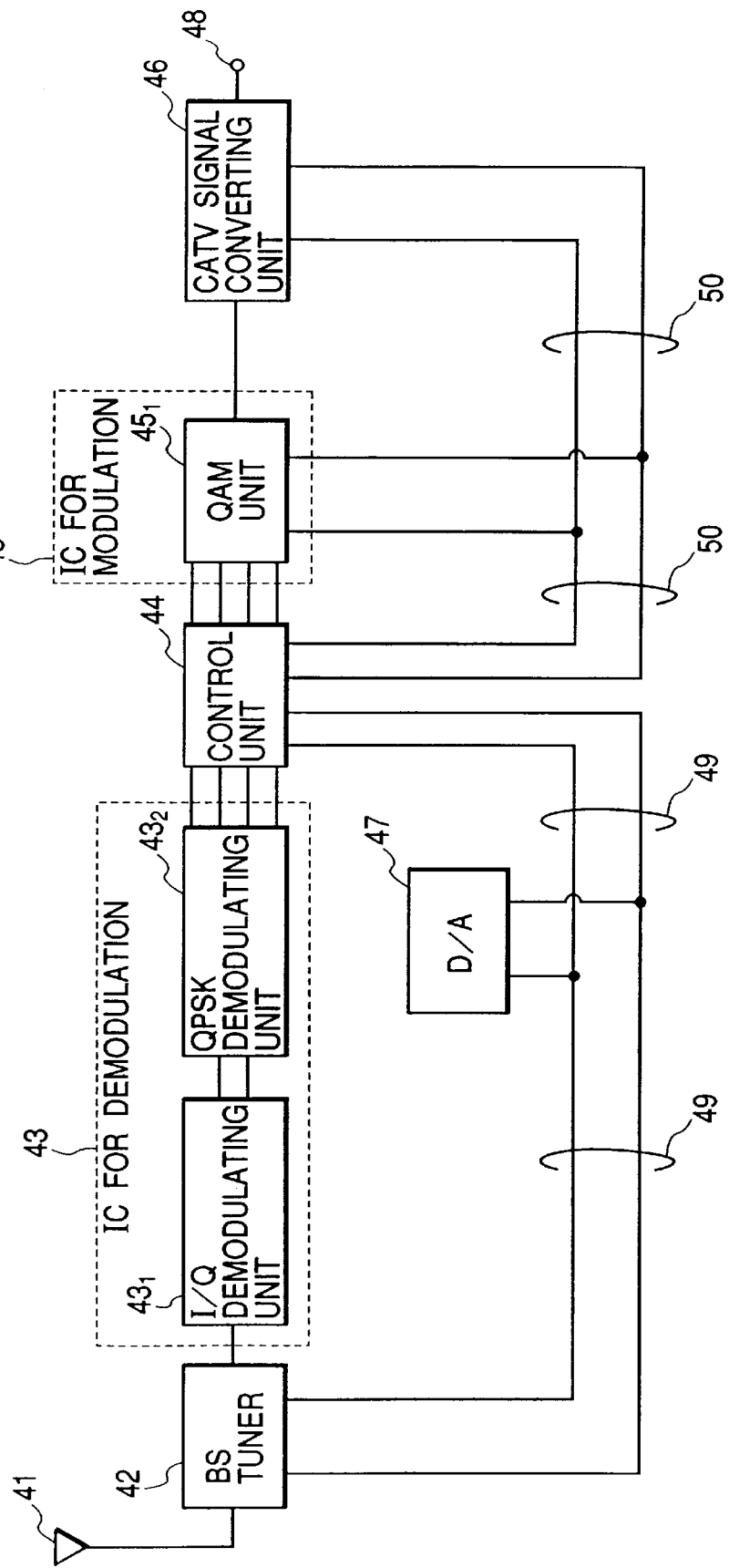
FIG. 4 is a block diagram showing an example of the configuration of a known satellite broadcast receiver.

FIG. 3 is a block diagram showing the configuration of a third embodiment of the receiver according to the invention and shows an example of similarly receiving a BS broadcast by the satellite broadcast tuner.

As shown in FIG. 3, in the receiver according to the third embodiment, the gate circuit 8 is connected to the I²C bus 11 connecting the control unit 4, IC 5 for modulation, and CATV signal converting unit 6. Specifically, the input side of the gate circuit 8 is connected to both the control signal output terminal of the control unit 4 and the control signal input and output terminals of the IC 5 for modulation via the I²C bus 11. The output side of the gate circuit 8 is connected to the channel selection signal input terminal of the CATV signal converting unit 6 via the I²C bus 11. In the gate circuit 8, one of the input terminals of the first AND gate $8_1$ is connected to one of the control signal input and output terminals of the IC 5 for modulation, the other input terminal of the first AND gate $8_1$ is connected to the control signal output terminal of the control unit 4, and the output terminal is connected to one of the channel selection signal input terminals of the CATV signal converting unit 6. One of the input terminals of the second AND gate $8_2$ is connected to the other one of the control signal input and output terminals of the IC 5 for modulation, the other input terminal is connected to the control signal output terminal of the control unit 4, and the output terminal is connected to the other channel selection signal input terminal of the CATV signal converting unit 6. Both of input terminals of the third AND gate $8_3$ are connected to one of the channel selection signal input terminals of the CATV signal converting unit 6 and the output terminal is connected to one of the control signal input and output terminals of the IC 5 for modulation. The configuration of the part including the BS broadcast receiving antenna 1, BS tuner 2, IC 3 for demodulation including the I/Q demodulating unit $3_1$ and the QPSK demodulating unit $3_2$, control unit 4, IC 5 for modulation including the QAM unit $5_1$ CATV signal converting unit 6, and CATV signal output terminal 9 is the same as that of the corresponding part in the first embodiment. In the third embodiment, the components same as those of FIG. 1 are designated by the same reference numerals.

In the receiver of the third embodiment, only when the channel selection signal is supplied from the control unit 4 to the CATV signal converting unit 6 via the I²C bus 11, the gate circuit 8 is turned on by the control signal outputted from the control unit 4, the channel selection signal is supplied via the gate circuit 8 to the CATV signal converting unit 6 to set the channel of the CATV signal outputted from the CATV signal converting unit 6. Except for the channel selection signal, the control signal is not supplied from the control unit 4 to the gate circuit 8. Since the gate circuit 8 is in the off state, the serial clock and serial data supplied from the control unit 4 to the IC 5 for modulation via the I²C bus 11 are checked by the gate circuit 8 and an unnecessary signal and data is not supplied to the CATV signal converting unit 6.

Since the operation except for the above-described operation in the receiver of the third embodiment is the same as that of the first embodiment, the detailed explanation of the operation of this point is omitted here.

In this case, the first or second embodiment may be adopted together with the third embodiment.

Although the example where the BS tuner 2 is used as the satellite broadcast tuner has been described in each of the foregoing embodiments, the satellite broadcast tuner in the invention is not limited to the BS tuner 2. The other tuner such as CS tuner may be also used.

According to the invention, when the channel selection signal is supplied to the satellite broadcast tuner, the gate circuit connected to the I²C bus is opened and the channel selection signal is supplied to the satellite broadcast tuner via the opened gate circuit. On the other hand, when the channel selection signal is not supplied to the satellite broadcast tuner, the gate circuit is closed and no signal or no data is supplied via the I²C bus to the satellite broadcast tuner. Consequently, unnecessary signal and data components are not multiplexed on each of the parts of the satellite broadcast tuner. A good quality intermediate frequency signal can be therefore outputted from the satellite broadcast tuner and the operating state of the satellite broadcast tuner does not deteriorate.

According to the invention, when the channel selection signal is supplied to the CATV signal converting unit, the gate circuit connected to the I²C bus is opened and the channel selection signal is supplied via the opened gate circuit to the CATV signal converting unit. On the other hand, when the channel selection signal is not supplied to the CATV signal converting unit, the gate circuit is closed and no signal or no data is supplied to the CATV signal converting unit via the I²C bus, and unnecessary signals and data components are not multiplexed on parts of the CATV signal converting unit. A good quality CATV signal can be outputted from the CATV signal converting unit and the operating state of the CATV signal converting unit does not deteriorate.

What is claimed is:

1. A receiver at least comprising:

a satellite broadcast tuner;

a demodulating unit;

a control unit;

a modulating unit;

a CATV signal converting unit; and a digital-to-analog converting unit, the control unit, a unit controlled by a control signal from the control unit, and the satellite broadcast tuner being connected to each other via an I²C bus, and a channel selection signal outputted from the control unit being supplied to the satellite broadcast tuner via the I²C bus, wherein a gate circuit is connected to the I²C bus, a gate ON signal is supplied to the gate circuit only when the channel selection signal is supplied to the satellite broadcast tuner, and the channel selection signal is supplied to the satellite broadcast tuner via the gate circuit, and wherein the controlled unit comprises an IC for demodulation including the demodulating unit, the gate circuit is connected to the I²C bus provided between the IC for demodulation and the satellite broadcast tuner, and a gate ON signal outputted from the control unit is supplied to the gate circuit.

2. A receiver according to claim 1, wherein the controlled unit further comprises an analog-to-digital converting unit connected between the control unit and the satellite broadcast tuner, the gate circuit is connected to the I²C bus which is provided between the analog-to-digital converting unit and the satellite broadcast tuner, and a gate ON signal outputted from the analog-to-digital converting unit is supplied to the gate circuit.

3. A receiver at least comprising:

a satellite broadcast tuner;

a demodulating unit;

a control unit;

a modulating unit;

a CATV signal converting unit; and a digital-to-analog converting unit, the control unit, an IC for modulation including the modulating unit, and the CATV signal converting unit being connected via an I²C bus for control signal transfer and a channel selection signal outputted from the control unit being supplied to the CATV signal converting unit via the I²C bus, wherein a gate circuit is connected to the I²C bus which is positioned between the IC for modulation and the CATV signal converting unit, a gate ON signal is supplied from the control unit to the gate circuit only when the channel selection signal is supplied to the CATV signal converting unit, and the channel selection signal is supplied to the CATV signal converting unit via the gate circuit.

* * * * *

UNITED STATES PATENT AND TRADEMARK OFFICE
CERTIFICATE OF CORRECTION

PATENT NO. : 6,738,979 B1
DATED : May 18, 2004
INVENTOR(S) : Shingo Saito

It is certified that error appears in the above-identified patent and that said Letters Patent is hereby corrected as shown below:

<u>Title page,</u>
Item [57], ABSTRACT,
Line 12, after "tuner via" insert -- the gate circuit. --.

Signed and Sealed this

Twelfth Day of October, 2004

JON W. DUDAS
*Director of the United States Patent and Trademark Office*